(12) United States Patent
Shibutani et al.

(10) Patent No.: US 8,722,782 B2
(45) Date of Patent: May 13, 2014

(54) POLYVINYL ALCOHOL-BASED RESIN COMPOSITION

(75) Inventors: Mitsuo Shibutani, Osaka (JP); Kaoru Inoue, Osaka (JP); Yuichi Takahashi, Osaka (JP)

(73) Assignee: The Nippon Synthetic Chemical Industry Co., Ltd., Osaka (JP)

( * ) Notice: Subject to any disclaimer, the term of this patent is extended or adjusted under 35 U.S.C. 154(b) by 231 days.

(21) Appl. No.: 13/266,546

(22) PCT Filed: Apr. 27, 2010

(86) PCT No.: PCT/JP2010/057463
§ 371 (c)(1),
(2), (4) Date: Oct. 27, 2011

(87) PCT Pub. No.: WO2010/126041
PCT Pub. Date: Nov. 4, 2010

(65) Prior Publication Data
US 2012/0041118 A1 Feb. 16, 2012

(30) Foreign Application Priority Data

Apr. 28, 2009 (JP) .................................. 2009-108621

(51) Int. Cl.
*C08K 5/04* (2006.01)
*C08K 5/00* (2006.01)

(52) U.S. Cl.
USPC .......................................... 524/394; 524/284

(58) Field of Classification Search
USPC ........................................................ 524/394
See application file for complete search history.

(56) References Cited

U.S. PATENT DOCUMENTS

| | | | |
|---|---|---|---|
| 4,485,225 A | 11/1984 | Satoh et al. | |
| 5,612,086 A | 3/1997 | Hakogi et al. | |
| 5,623,086 A | 4/1997 | Perri et al. | |
| 5,674,958 A | 10/1997 | Fukumura et al. | |
| 5,744,547 A | 4/1998 | Moritani et al. | |
| 6,072,079 A | 6/2000 | Cook | |
| 6,288,165 B1 | 9/2001 | Moritani et al. | |
| 2007/0196679 A1* | 8/2007 | Moriyama et al. | 428/518 |
| 2009/0186235 A1* | 7/2009 | Onishi et al. | 428/515 |

FOREIGN PATENT DOCUMENTS

| | | |
|---|---|---|
| JP | 58-198509 | 11/1983 |
| JP | 4-213302 | 8/1992 |
| JP | 6-87909 | 3/1994 |
| JP | 9-71620 | 3/1997 |
| JP | 2002-37802 | 2/2002 |
| JP | 2006-89538 | 4/2006 |
| JP | 2006-124668 | 5/2006 |
| JP | 2007031601 A * | 2/2007 |
| WO | 00/24702 | 5/2000 |
| WO | 2007/129369 | 11/2007 |

OTHER PUBLICATIONS

Translation of JP 2007-031601, Feb. 8, 2007.*
Search report from International Application No. PCT/JP2010/057463, mail date is Jun. 29, 2010.

* cited by examiner

*Primary Examiner* — Hui Chin
(74) *Attorney, Agent, or Firm* — Greenblum & Bernstein, P.L.C.

(57) ABSTRACT

The present invention provides a polyvinyl alcohol-based resin composition having less coloration from melt processing and having high aging stability of the melt viscosity comprising a polyvinyl alcohol-based rein having a structural unit represented by the following formula (1) and having an absorbance of 0.1 to 0.3 of 280 nm in an ultraviolet absorbance spectrum as a 4 mass % aqueous solution, a carboxylic acid and an alkaline (earth) metal salt, wherein when an aqueous solution of the polyvinyl alcohol-based resin composition is prepared so as to have a content of the polyvinyl alcohol-based resin of 4 mass %, the pH of the aqueous solution at 20° C. is from 5.5 to 7:

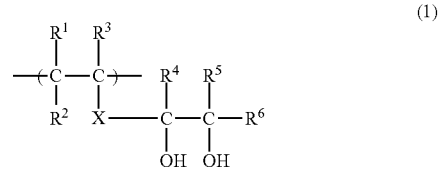

(1)

wherein $R^1$, $R^2$ and $R^3$ independently represent a hydrogen atom or an organic group, X represents a single bond or a bonding chain, and $R^4$, $R^5$ and $R^6$ independently represent a hydrogen atom or an organic group.

3 Claims, No Drawings

POLYVINYL ALCOHOL-BASED RESIN COMPOSITION

TECHNICAL FIELD

The present invention relates to a polyvinyl alcohol-based resin composition. More specifically, the present invention relates to a polyvinyl alcohol-based resin (hereinafter, sometimes referred to as a PVOH-based resin) composition for melt processing, in which coloration due to melt processing is reduced and aging stability of the melt viscosity is high.

BACKGROUND ART

A PVOH-based resin is excellent in water solubility, solvent resistance, gas barrier property, strength, transparency, hydrophilicity and the like and is used for various applications such as article packaging. Usually, a PVOH-based resin has a melting point and a thermal decomposition temperature close to each other, and in the case of obtaining a molded article, particularly a film or the like, by melt processing, the molding must be performed at a temperature near the decomposition temperature and this causes a problem in the appearance (mixing of an extraneous substance due to burnt deposit or thermal decomposition product) or long-run processability.

As a PVOH-based resin capable of melt processing, an ethylene-vinyl alcohol copolymer reduced in the melting point by ethylene modification is known, but this is not water-soluble and cannot avoid impairment of gas barrier property. As another PVOH-based resin capable of melt processing, a PVOH-based resin having a 1,2-diol component in the side chain has been proposed (Patent Document 1). This PVOH-based resin having a 1,2-diol component in the side chain is reduced in the melting point while keeping water solubility or gas barrier property and can be molded at a low temperature, so that thermal decomposition during melt processing can be suppressed and a molded article with good appearance free from generation of a burnt deposit, a gel and a fish eye can be obtained.

However, although thermal melt processing is possible for the PVOH-based resins, despite capability of hot melt processing, such PVOH-based resins have problem, that when the molding in the melt processing is performed at a high temperature, particularly 200° C. or higher, the molded article tends to be colored and the viscosity of the resin in the melted state increases with time. Therefore, there is a room for further improvements.

RELATED DOCUMENT

Patent Document
Patent Document 1: JP-A-2006-89538

SUMMARY OF THE INVENTION

Problems that the Invention is to Solve

The present invention has been made under these circumstances and an object of the present invention is to provide a PVOH-based resin composition capable of melt processing, in which coloration due to melt processing is reduced and aging stability of the melt viscosity is high.

Means for Solving the Problems

First, the present inventors have made intensive studies on the cause of coloration by taking the above situations into consideration and found that a carbonyl group present in a PVOH-based resin affects coloration. The reason why the carbonyl group affects coloration is not clearly known, but it is considered that in a PVOH-based resin having a carbonyl group, a hydroxyl group adjacent to the carbonyl group is readily dehydrated, as a result, a conjugated double bond structure composed of $-CO-(CH=CH)_n-$ which causes coloration is formed.

In addition, the present inventors have found that a carbonyl group present in a PVOH-based resin also affects the aging stability of the melt viscosity. The reason why the carbonyl group affects the aging stability of the melt viscosity is not clearly known, but there may be considered, for example, an increase in the melt viscosity due to a crosslinking reaction such as acetalization or ketalization of the carbonyl group with a hydroxyl group of the PVOH-based resin, which is accelerated by an acid component or an alkali component in the PVOH-based resin, or a decrease in the melt viscosity due to decomposition by a retroaldol reaction starting at the terminal carbonyl group.

Therefore, the present inventors have succeeded in solving the above problems by specifying the absorbance of 280 nm in an ultraviolet absorbance spectrum, which is an indicative of the amount of the carbonyl group introduced into a PVOH-based resin of an aqueous solution, and at the same time, adjusting the pH of the aqueous solution to fall in a predetermined range with use of a carboxylic acid and an alkaline (earth) metal salt. Incidentally, the reason why the aging stability of the melt viscosity is enhanced is not clearly known, but it is considered that when the pH of the aqueous solution is adjusted using a carboxylic acid and an alkaline (earth) metal salt, the scission of PVOH molecules occurring during melt processing and the crosslinking reaction between PVOH molecules are balanced to reduce the change in the apparent molecular weight and in turn, the change of the melt viscosity with time is reduced.

That is, the PVOH-based resin composition of the present invention comprises a polyvinyl alcohol-based resin comprising a structural unit represented by the following formula (1) and having an absorbance of 0.1 to 0.3 of 280 nm in an ultraviolet absorbance spectrum when a 4 mass % aqueous solution thereof is prepared, a carboxylic acid, and an alkaline (earth) metal salt; in which, when an aqueous solution is prepared so as to have a content of the polyvinyl alcohol-based resin of 4 mass %, the pH of the aqueous solution at 20° C. is from 5.5 to 7. In this regard, the expression an alkaline (earth) metal salt means an alkaline metal salt and/or an alkaline-earth metal salt.

[Chem. 1]

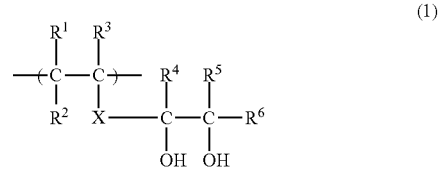

(1)

[In the formula, $R^1$, $R^2$ and $R^3$ independently represent a hydrogen atom or an organic group, X represents a single bond or a bonding chain, and $R^4$, $R^5$ and $R^6$ independently represent a hydrogen atom or an organic group.]

Furthermore, the present inventors have found that a carbonyl group present in a PVOH-based resin is introduced into the polymer resulting from chain transfer of the polymerization chain terminal of a vinyl ester to an aldehyde compound present in the system at the polymerization of a vinyl ester such as vinyl acetate, or is formed due to oxidation of a hydroxyl group during polymerization or drying at a high temperature. Such an aldehyde compound is presumed to include, for example, acetaldehyde derived from a vinyl alcohol produced by a transesterification reaction of vinyl acetate with methanol as a polymerization solvent, and formaldehyde produced resulting from oxidation of methanol as a polymerization solvent by a polymerization initiator which is widely used for the polymerization of vinyl acetate and has long half-life and high activity (e.g., AIBN [half-life: 32 hours], acetyl peroxide [half-life: 32 hours], benzoyl peroxide [half-life: 60 hours]).

Thus, the present inventors found that, among the PVOH-based resin composition of the present invention, the PVOH-based resin composition wherein the polyvinyl alcohol-based resin comprising the structural unit represented by the formula (1) is obtained by saponification of a copolymerization product which is produced by copolymerizing a vinyl ester-based monomer and a compound having a 1,2-diol structure represented by the following formula (2) or a derivative thereof, using an organic peroxide having a half-life at 60° C. of 10 to 300 minutes as a polymerization initiator, is further preferred.

[Chem. 2]

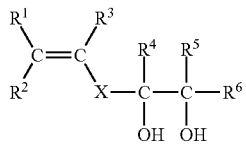

(2)

[In the formula, $R^1$, $R^2$ and $R^3$ independently represent a hydrogen atom or an organic group, X represents a single bond or a bonding chain, and $R^4$, $R^5$ and $R^6$ independently represent a hydrogen atom or an organic group.]

Also, as described above, the PVOH-based resin composition of the present invention has singular non-colorability and aging stability of the melt viscosity compared with conventional compositions and therefore, can be specified as follows. That is, the PVOH-based resin composition of the present invention is characterized in that a YI (Yellow Index) value as an extruded product obtained using an extruder under a condition of a resin temperature of 210° C. and a residence time of 3 minutes is 50 or less, and a ratio of a torque at 60 minutes after the start of kneading to a torque after 10 minutes is 3 or less when melt-kneaded at a resin temperature of 230° C. with Plastograph.

That is, the present invention includes the following embodiments.

[1] A polyvinyl alcohol-based resin composition comprising:

a polyvinyl alcohol-based resin which comprises a structural unit represented by the following formula (1), and has an absorbance of 0.1 to 0.3 of 280 nm in an ultraviolet absorbance spectrum when a 4 mass % aqueous solution thereof is prepared;

a carboxylic acid; and at least one of an alkaline metal salt and an alkaline-earth metal salt, wherein, when an aqueous solution of the polyvinyl alcohol-based resin composition is prepared so as to have a content of the polyvinyl alcohol-based resin of 4 mass %, the pH of the aqueous solution at 20° C. is from 5.5 to 7:

[Chem. 3]

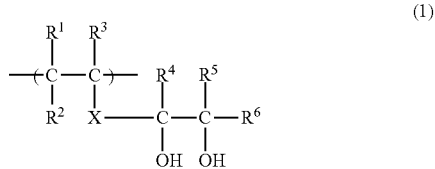

(1)

[wherein $R^1$, $R^2$ and $R^3$ independently represent a hydrogen atom or an organic group, X represents a single bond or a bonding chain, and $R^4$, $R^5$ and $R^6$ independently represent a hydrogen atom or an organic group].

[2] The polyvinyl alcohol-based resin composition as described in [1], wherein the polyvinyl alcohol-based resin comprising the structural unit represented by the formula (1) is obtained by saponification of a copolymerization product which is produced by copolymerizing a vinyl ester-based monomer and a compound having a 1,2-diol structure represented by the following formula (2) or a derivative thereof, using an organic peroxide having a half-life at 60° C. of 10 to 300 minutes as a polymerization initiator:

[Chem. 4]

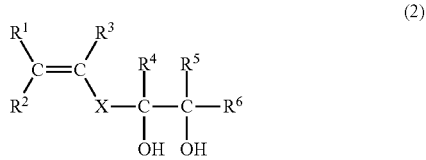

(2)

[wherein $R^1$, $R^2$ and $R^3$ independently represent a hydrogen atom or an organic group, X represent a single bond or a bonding chain, and $R^4$, $R^5$ and $R^6$ independently represent a hydrogen atom or an organic group].

[3] A polyvinyl alcohol-based resin composition, in which a YI value as an extruded product obtained using an extruder under a condition of a resin temperature of 210° C. and a residence time of 3 minutes is 50 or less, and a ratio of a torque at 60 minutes after the start of kneading to a torque after 10 minutes is 3 or less when melt-kneaded at a resin temperature of 230° C. with Plastograph.

Effects of the Invention

The PVOH-based resin composition of the present invention less suffers from coloration due to melt processing and has high aging stability of the melt viscosity and therefore, the composition can be suitably used for melt processing.

MODE FOR CARRYING OUT THE INVENTION

The present invention is described in detail below.

The PVOH-based resin composition of the present invention contains a PVOH-based resin having a structural unit represented by the following formula (1) and an absorbance of 0.1 to 0.3 of 280 nm in an ultraviolet absorbance spectrum when a 4 mass % aqueous solution thereof is prepared, a carboxylic acid and an alkaline (earth) metal salt. First, the PVOH-based resin for use in the present invention is described.

The PVOH-based resin for use in the present invention has a 1,2-diol structural unit represented by the following formula (1), wherein in the formula (1), $R^1$, $R^2$ and $R^3$ independently represent a hydrogen atom or an organic group, X represents a single bond or a bonding chain, and $R^4$, $R^5$ and $R^6$ independently represent a hydrogen atom or an organic group.

[Chem. 5]

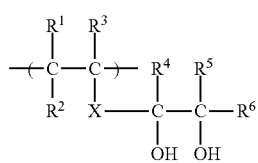

(1)

In the structural unit represented by the formula (1), all of $R^1$ to $R^3$ and $R^4$ to $R^6$ are preferably a hydrogen atom, and a PVOH-based resin having a structural unit represented by the following formula (1') is preferably used.

[Chem. 6]

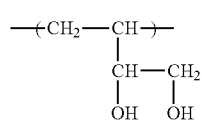

(1')

In the structural unit represented by the formula (1), each of $R^1$ to $R^3$ and $R^4$ to $R^6$ may be an organic group if the amount thereof does not impair the resin characteristics, and the organic group is not particularly limited but is preferably an alkyl group having a carbon number of 1 to 4, such as methyl group, ethyl group, n-propyl group, isopropyl group, n-butyl group, isobutyl group and tert-butyl group. If desired, this alkyl group may have a substituent such as halogen group, hydroxyl group, ester group, carboxylic acid group or sulfonic acid group.

In view of thermal stability and structural stability under high-temperature/acidic conditions, X in the structural unit represented by the formula (1) is most preferably a single bond but may be a bonding chain within the range not impairing the effects of the present invention. Such a bonding chain is not particularly limited but examples thereof include a hydrocarbon group such as alkylene, alkenylene, alkynylene, phenylene and naphthylene (these hydrocarbon groups may have a halogen such as fluorine, chlorine and bromine), —O—, —$(CH_2O)_m$—, —$(OCH_2)_m$—, —$(CH_2O)_mCH_2$—, —CO—, —COCO—, —$CO(CH_2)_mCO$—, —$CO(C_6H_4)$CO—, —S—, —CS—, —SO—, —$SO_2$—, —NR—, —CONR—, —NRCO—, —CSNR—, —NRCS—, —NRNR—, —$HPO_4$—, —$Si(OR)_2$—, —$OSi(OR)_2$—, —$OSi(OR)_2O$—, —$Ti(OR)_2$—, —$OTi(OR)_2$—, —$OTi(OR)_2O$—, —Al(OR)—, —OAl(OR)— and —OAl(OR)O— (wherein each R is independently an arbitrary substituent and is preferably a hydrogen atom or an alkyl group, and m is a natural number). Among these, in view of stability at the production or in use, an alkylene group having a carbon number of 6 or less is preferred, and methylene group or —$CH_2OCH_2$— is particularly preferred.

The PVOH-based resin for use in the present invention contains the structural unit represented by the above formula (1) in a ratio of usually from 1 to 15 mol %, preferably from 2 to 10 mol %, more preferably from 3 to 9 mol %. If the molar fraction of the structural unit represented by the above formula (1) is excessively large, a PVOH-based resin having a desired polymerization degree tends to be hardly obtained. On the other hand, if the molar fraction is too small, the melting point becomes high and comes close to the thermal decomposition temperature and this readily allows for generation of burnt deposits, gels or fish eyes due to thermal decomposition during melt processing.

The content (molar fraction) of the 1,2-diol structural unit represented by the formula (1) in the PVOH-based resin can be determined from the $^1$H-NMR spectrum (solvent: DMSO-d6, internal standard: tetramethylsilane) of the completely saponified PVOH-based resin and specifically, can be calculated from the peak areas assigned to, for example, hydroxyl group proton, methine proton and methylene proton in the 1,2-diol unit, methylene proton in the main chain, and proton of a hydroxyl group connected to the main chain.

The saponification degree (measured in accordance with JIS K6726) of the PVOH-based resin for use in the present invention is usually from 80 to 100 mol %, preferably from 85 to 99.9 mol %, more preferably from 88 to 99.5 mol %. If the saponification degree is too low, the stability of the melt viscosity is liable to become insufficient at the melt processing and also, the odor of acetic acid produced due to decomposition of the vinyl acetate structural unit moiety tends to be noticeable.

The average polymerization degree (measured in accordance with JIS K6726) of the PVOH-based resin is usually from 200 to 1,800, preferably from 300 to 1,500, more preferably from 300 to 1,000. If the average polymerization degree is too high, the melt viscosity becomes high and the processability tends to be impaired. On the other hand, if the average polymerization degree is too low, the mechanical strength of the molded article tends to be insufficient.

The PVOH-based resin for use in the present invention has, when a 4 mass % aqueous solution thereof is prepared, an absorbance of usually from 0.1 to 0.3, preferably from 0.1 to 0.28, more preferably from 0.1 to 0.25, of 280 nm in an ultraviolet absorbance spectrum. The absorption at 280 nm is due to the lone carbonyl group when n=0 in the structure —CO—$(CH=CH)_n$— contained in the PVOH-based resin, and the conjugated carbonyl group when n=2. If the absorbance is too large, the conjugated system extends to the long wavelength side, coloration becomes easily generated and the thermal stability tends to be reduced. On the other hand, a resin having an absorbance of less than 0.1 is not obtained by the general industrial production method, and in order to obtain a PVOH-based resin having a small absorbance, a production method with low production efficiency, such as extremely-low temperature polymerization, is required. Accordingly, such a PVOH-based resin is not preferred in view of productivity and cost. Incidentally, the absorbance can be measured using an UV spectrophotometer by preparing a 4 mass % aqueous solution of the PVOH-based resin, but may be also measured with a UV spectrophotometer after an aqueous solution containing 4 mass % of the PVOH-based resin is prepared using a PVOH-based resin composition containing a carboxylic acid and an alkaline (earth) metal salt.

The method for adjusting the above absorbance of the aqueous PVOH-based resin solution to fall in the range specified in the present invention is not particularly limited, but examples thereof include, a) a method of reducing the amount of an aldehyde compound in the polymerization system by performing the polymerization in the presence of a chelating agent such as hydroxycarboxylic acid (e.g., tartaric acid, citric acid), polyvalent carboxylic acid, L-scorbic acid, D-araboascorbic acid, hydroxylactone (e.g., D-glucono-1,5-lactone), polyhydric alcohol (e.g., D-sorbitol, D-xylose), and polyvalent amine (e.g., tetramethylethylenediamine), b) a method of using a polymerization initiator having a short half-life, c) a method of performing polymerization at a low temperature by using a low temperature active polymerization initiator, d) a method of using a polymerization initiator having a weak oxidizing power, e) a method of not using a vinyl ester monomer such as recovered vinyl acetate or, in the case of using a vinyl ester monomer, reducing the aldehyde compound content as much as possible by distillation or the like, and f) a method of using a polymerization inhibitor incapable of accelerating extension of the conjugated system at the PVOH-based resin terminal to the long wavelength side, such as p-methoxyphenol and α-methylstyrene dimer, or reducing the amount of the inhibitor as much as possible. Among these, in view of excellent productivity and little effect on other resin properties, the method of b) is preferably used.

Next, the production method of the PVOH-based resin having the structural unit represented by the formula (1) is described. The production method of such a PVOH-based resin is not particularly limited but includes, for example, a method of saponification of a copolymerization product obtained by copolymerizing a vinyl ester-based monomer and a compound having a 1,2-diol structure represented by the following formula (2) or a derivative thereof. Incidentally, two or more kinds of vinyl ester-based monomer and two or more kinds of the compound of the formula (2) or a derivative thereof may be copolymerized.

[Chem. 7]

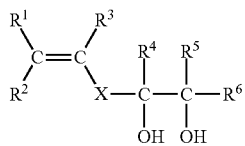

(2)

In the structural unit represented by the formula (2), each of $R^1$, $R^2$, $R^3$, X, $R^4$, $R^5$ and $R^6$ is the same as in the formula (1).

Examples of the vinyl ester-based monomer for use in the production of the PVOH-based resin include vinyl formate, vinyl acetate, vinyl propionate, vinyl valerate, vinyl butyrate, vinyl isobutyrate, vinyl pivalate, vinyl caprate, vinyl laurate, vinyl stearate, vinyl benzoate, vinyl versatate, and vinyl trifluoroacetate. Among these, in view of profitability, vinyl acetate is preferably used.

The method for producing the PVOH-based resin from a compound having a 1,2-diol structure represented by the formula (2) or a derivative thereof and a vinyl ester-based monomer is not particularly limited, but (i) a method of saponification of a copolymer of a vinyl ester-based monomer and a compound represented by the following formula (3), (ii) a method of saponification and decarboxylation of a copolymer of a vinyl ester-based monomer and a compound represented by the following formula (4), and (iii) a method of saponification and solvolysis of ketal structure a copolymer of a vinyl ester-based monomer and a compound represented by the following formula (5), may be preferably used. Incidentally, as for the methods of (i), (ii) and (iii), the methods described, for example, in JP-A-2006-95825 may be employed.

[Chem. 8]

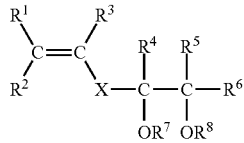

(3)

[Chem. 9]

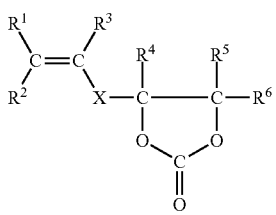

(4)

[Chem. 10]

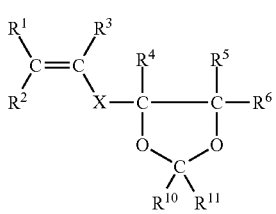

(5)

In the above formulae (3), (4) and (5), each of $R^1$, $R^2$, $R^3$, X, $R^4$, $R^5$ and $R^6$ is the same as in the formula (1). $R^7$ and $R^8$ are independently a hydrogen atom or $R^9$—CO— (wherein $R^9$ is an alkyl group), $R^{10}$ and $R^{11}$ are independently a hydrogen atom or the same organic group as in $R^1$ to $R^6$.

Examples of the compound represented by the formula (3) include 3,4-dihydroxy-1-butene, 3,4-diacyloxy-1-butene, 3-acyloxy-4-hydroxy-1-butene, 4-acyloxy-3-hydroxy-1-butene, 3,4-diacyloxy-2-methyl-1-butene, 4,5-dihydroxy-1-pentene, 4,5-diacyloxy-1-pentene, 4,5-dihydroxy-3-methyl-1-pentene, 4,5-diacyloxy-3-methyl-1-pentene, 5,6-dihydroxy-1-hexene, 5,6-diacyloxy-1-hexene, and glycerin monoallyl ether. Among these, from the standpoint that copolymerization reactivity and industrial handleability are excellent, 3,4-diacyloxy-1-butene in which in the formula (3), each of $R^1$ to $R^6$ is hydrogen, X is a single bond, each of $R^7$ and $R^8$ is $R^9$—CO— and $R^9$ is an alkyl group is preferred, and among them, 3,4-diacetoxy-1-butene in which $R^9$ is methyl group is more preferably used.

In the method of (i), when vinyl acetate is used as the vinyl ester-based monomer and copolymerized with 3,4-diacetoxy-1-butene, the reactivity ratio of respective monomers is r(vinylacetate)=0.710 and r(3,4-diacetoxy-1-butene)=0.701, and this shows that 3,4-diacetoxy-1-butene is excellent in the copolymerization reactivity with vinyl acetate compared with the case of vinyl ethylene carbonate which is a compound represented by the formula (4) used in the method of (ii), where r(vinyl acetate)=0.85 and r(vinyl ethylene carbonate)=5.4.

Also, the chain transfer constant of 3,4-diacetoxy-1-butene in the copolymerization with vinyl acetate is Cx(3,4-diacetoxy-1-butene)=0.003 (65° C.), and this shows that it is unlikely to be the cause of the situation in which polymerization degree is difficult to be elevated or the polymerization rate is reduced; as compared with the case of vinyl ethylene carbonate where Cx(vinyl ethylene carbonate)=0.005 (65° C.) or the case of 2,2-dimethyl-4-vinyl-1,3-dioxolane as a compound represented by the formula (5) used in the method of (iii) where Cx(2,2-dimethyl-4-vinyl-1,3-dioxolane)=0.023 (65° C.).

As for 3,4-diacetoxy-1-butene, the by-product generated during saponification of a copolymerization product thereof is the same as the compound by-produced at the saponification from a structural unit originated in vinyl acetate frequently used as a vinyl ester-based monomer, and this is industrially very advantageous in that a special apparatus or step need not be purposely provided in the post-treatment or solvent recovery system and a conventional equipment can be utilized.

Incidentally, as 3,4-diacetoxy-1-butene above, for example, a product produced by a synthesis route starting from 1,3-butadiene described in International Publication WO00/24702, or a product produced using an epoxybutene derivative as an intermediate according to the techniques described in U.S. Pat. No. 5,623,086 and U.S. Pat. No. 6,072,079 is available, and each of the products of Across Co., Ltd. at the reagent level is available on the market. Also, crude 3,4-diacetoxy-1-butene obtained as a by-product in the process of producing 1,4-butanediol may be purified and utilized.

Furthermore, 1,4-diacetoxy-1-butene as an intermediate product in the process of producing 1,4-butanediol may be also used after converting into 3,4-diacetoxy-1-butene through isomerization by a known isomerization reaction using a metal catalyst such as palladium chloride. In addition, it may be also produced in accordance with the production method of an organic diester described in International Publication WO00/24702.

In the PVOH-based resin obtained by the method of (ii) or (iii) above, when the degree of saponification is low or the decarboxylation or deacetalization is insufficient, a carbonate ring or an acetal ring sometimes remains at the side chain; and as a result, use of such a PVOH-based resin for melt processing tends to involve generation of an extraneous substance due to a gel or crosslinking. Also for this reason, the PVOH-based resin obtained by the method of (i) is preferred.

In addition to the above monomers (a vinyl ester-based monomer and the compounds represented by the formulae (2) to (5)), α-olefins such as ethylene and propylene; hydroxyl group-containing α-olefins such as 3-buten-1-ol, 4-penten-1-ol and 5-hexene-1,2-diol, and derivatives thereof, such as acylation product; unsaturated acids such as itaconic acid, maleic acid and acrylic acid, or salts or mono- or di-alkyl esters thereof; nitriles such as acrylonitrile; amides such as methacrylamide and diacetoneacrylamide; olefin sulfonic acids such as ethylenesulfonic acid, allylsulfonic acid, methallylsulfonic acid and AMPS (2-acrylamido-2-methylpropanesulfonic acid), and salts thereof; and allyl compounds such as ethylene oxide monoallyl ether, may be copolymerized as a copolymerization component, within the range not greatly affecting the resin properties.

Furthermore, a polymer, in which the amount of the main chain 1,2-glycol bond is adjusted to be from 1.5 to 3 mol % by copolymerization with vinylene carbonate or by setting the temperature condition at the polymerization to a high temperature, may be also used.

The method for copolymerizing the monomers above is not particularly limited, and a known method such as bulk polymerization, solution polymerization, suspension polymerization, dispersion polymerization or emulsion polymerization may be employed, but from the standpoint that a linear polymer is easily obtained, solution polymerization is usually performed. The method for charging monomer components at the time of copolymerization is not particularly limited, and an arbitrary method such as batch charging, split charging and continuous charging may be employed, but from the standpoint that the compound represented by the formulae (2) to (5) can be uniformly distributed in the molecular chain of the polyvinyl ester-based polymer, dropping polymerization is preferred, and a polymerization method based on the HANNA method is preferred.

The solvent usually used in such copolymerization includes lower alcohols such as methanol, ethanol, isopropyl alcohol, n-propanol and butanol, ketones such as acetone and methylethylketone, and a mixed solvent thereof, and methanol is suitably used in industry. The amount of the solvent used may be appropriately selected in consideration of the chain transfer constant of the solvent according to the polymerization degree of the objective copolymer. For example, when the solvent is methanol, the amount is selected from the range of S (solvent)/M (monomer)=0.01 to 10 (weight ratio), preferably 0.05 to 3 (weight ratio).

At the copolymerization, a polymerization initiator is usually used. The polymerization initiator is not particularly limited and examples thereof include a known radical polymerization initiator such as azobisisobutyronitrile, acetyl peroxide, benzoyl peroxide and lauryl peroxide, and a low temperature active radical polymerization initiator such as azobisdimethylvaleronitrile and azobismethoxydimethylvaleronitrile. However, for reducing the carbonyl group content in the PVOH-based resin and adjusting the absorbance to the range specified in the present invention, a polymerization initiator having a short half-life is preferably used. Specifically, it is preferred to use an organic peroxide having a half-life at 60° C. of usually from 10 to 300 minutes, preferably from 15 to 250 minutes, more preferably from 20 to 200 minutes. If the half-life of the polymerization initiator is too long, the produced PVOH-based resin is liable to have a high YI value, whereas if the half-life is too short, control of the polymerization tends to become difficult. The half-life as used here indicates a half-life measured, for example, in toluene (azo compound) or benzene (other polymerization initiators) at 60° C.

Specific examples of the organic peroxide having a half-life at 60° C. of 10 to 300 minutes include azo compounds such as 2,2'-azobis-(2,4-dimethylvaleronitrile) [half-life: 150 minutes] and 2,2'-azobis-(4-methoxy-2,4-dimethylvaleronitrile) [half-life: 11 minutes], peroxyesters such as t-butyl peroxyneodecanoate [half-life: 102 minutes], t-butyl peroxypivalate [half-life: 288 minutes] and t-hexyl peroxypivalate [half-life: 222 minutes], peroxydicarbonates such as bis-(4-t-butylcyclohexyl)peroxy-di-carbonate [half-life: 40 minutes], di-2-ethylhexyl peroxy-di-carbonate [half-life: 50 minutes], di-isopropyl peroxydicarbonate [half-life: 36 minutes] and di-n-propyl peroxydicarbonate [half-life: 42 minutes], and diacyl peroxides such as isobutyral peroxide [half-life: 16 minutes].

The amount of the polymerization initiator used varies depending on the kind of the polymerization initiator and cannot be indiscriminately determined but is arbitrarily selected according to the polymerization rate. For example, in the case of using an organic peroxide having a half-life at 60° C. of 10 to 300 minutes, the amount is usually from $1 \times 10^{-7}$ to $1 \times 10^{-2}$ mol %, preferably from $1 \times 10^{-6}$ to $1 \times 10^{-3}$ mol %, based on the vinyl ester-based monomer. If the amount of the polymerization initiator used is too large, control of the polymerization rate or heating value tends to become difficult, whereas if it is too small, the polymerization requires a long time and the productivity is liable to decrease. The reaction temperature at the polymerization reaction varies depending on the solvent used, pressure or heat removing capacity of the polymerization can and cannot be indiscriminately determined, but is usually from 50 to 130° C., preferably from 55° C. to the boiling point under atmospheric pressure. If the reaction temperature is too high, control of the polymerization tends to become difficult, whereas if it is too low, the polymerization is liable to hardly proceed. Two or more kinds of polymerization initiators differing in the half-life may be used, and two or more kinds of polymerization initiators may be charged sequentially or simultaneously.

The copolymerization product obtained by copolymerization is then saponified. This saponification is performed by dissolving the obtained copolymerization product in an alcohol or a hydrous alcohol and using an alkali catalyst or an acid catalyst. Examples of the alcohol include methanol, ethanol, propanol, tert-butanol, and mixed solvent such as methanol/methyl acetate and methanol/benzene, and above all, methanol is preferably used. The concentration of the copolymerization product in the alcohol is appropriately selected according to the viscosity of the system but is usually selected from the range of 10 to 60 mass %. The catalyst used for saponification includes an alkali catalyst such as alkaline metal hydroxide or alcoholate (e.g., sodium hydroxide, potassium hydroxide, sodium methylate, sodium ethylate, potassium methylate, lithium methylate), and an acid catalyst such as sulfuric acid, hydrochloric acid, nitric acid, metasulfonic acid, zeolite and cation-exchange resin.

Examples of the apparatus used for such a saponification reaction include a kneader, a belt-like continuous saponification apparatus, and a twin-screw extruder.

The amount of the saponification catalyst used is appropriately selected according to the saponification method, the target degree of saponification, and the like, but in the case of using an alkali catalyst, the amount used is usually from 0.1 to 30 mmol, preferably from 2 to 17 mmol, per mol of the total amount of the vinyl ester-based monomer and the compound represented by the formulae (2) to (5). Also, the reaction temperature in the saponification reaction is not particularly limited but is preferably from 10 to 60° C., more preferably from 20 to 50° C.

The PVOH-based resin composition of the present invention contains a carboxylic acid and an alkaline (earth) metal salt together with the above PVOH-based resin. The carboxylic acid includes, for example, an aliphatic carboxylic acid and an aromatic carboxylic acid, and among these, an aliphatic carboxylic acid is preferably used. Also, the carboxylic acid includes a monocarboxylic acid and a dicarboxylic acid, and a monocarboxylic acid is preferably used. A carboxylic acid having a carbon number of usually from 2 to 18, preferably from 2 to 10, more preferably from 2 to 5, is used, and above all, a water-soluble carboxylic acid is preferably used. Specific examples thereof include acetic acid, propionic acid, butyric acid, valeric acid, oxalic acid, malonic acid, and succinic acid, and among these, acetic acid is suitably used.

The carboxylic acid content is usually from 0.001 to 0.2 parts by mass, preferably from 0.002 to 0.15 parts by mass, more preferably from 0.002 to 0.1 parts by mass, per 100 parts by mass of the PVOH-based resin. The method for incorporating a carboxylic acid is not particularly limited, but addition in the process of producing the PVOH-based resin is effective and particularly, the carboxylic acid added after saponification of the copolymerization product above by using an alkali catalyst is preferably contained by appropriately adjusting the consumption by neutralization. Incidentally, two or more kinds of carboxylic acids may be incorporated.

The alkaline (earth) metal salt is an organic acid salt or inorganic acid salt of an alkaline metal and/or an alkaline-earth metal. Examples of the alkaline metal include potassium and sodium, and examples of the alkaline-earth metal include calcium and magnesium. Among these, an alkaline metal is preferred because of a large effect relative to the amount used, and a sodium salt is more preferred.

The organic acid salt includes a salt of a carboxylic acid such as acetic acid, propionic acid, butyric acid, lauric acid, stearic acid, oleic acid and behenic acid, and the inorganic acid salt includes a salt of sulfuric acid, sulfurous acid, carbonic acid, phosphoric acid or the like. Among these, an organic acid salt is preferably used because the free acid when liberated has a small effect on the resin or forming device. Incidentally, the acid used for the alkaline (earth) metal salt may be the same as or different from the above carboxylic acid but is preferably the same.

The content of the alkaline (earth) metal salt is, in terms of the metal based on the PVOH-based resin, usually from 0.0002 to 1 mol %, preferably from 0.001 to 0.6 mol %, more preferably from 0.002 to 0.2 mol %. Two or more kinds of alkaline (earth) metal salts may be incorporated. Here, in the case of containing both an alkaline metal salt and an alkaline-earth metal salt, the content above indicates the total amount thereof.

The method for incorporating an alkaline (earth) metal salt is not particularly limited, and example thereof include a method where an alkaline metal-containing alkaline substance is used as the saponification catalyst at the production (saponification) of the PVOH-based resin and after the saponification, the PVOH-based resin is washed or neutralized with an acid to control the amount of the alkaline metal salt contained in the resin; a method where before the drying step in the production of the PVOH-based resin, an aqueous metal salt solution is mixed with the PVOH-based resin; and a method of mixing a metal salt with the PVOH-based resin in a melted state. Above all, a method of using an alkaline-metal-containing alkaline substance as the saponification catalyst and, when neutralizing with an acid, using a carboxylic acid, is suitable as the production method for the resin composition of the present invention, because respective contents of the carboxylic acid and the alkaline (earth) metal salt in the resin composition can be controlled at the same time.

Incidentally, the content of the alkaline (earth) metal salt in the PVOH-based resin can be determined by an atomic absorption analysis method.

In the PVOH-based resin composition of the present invention, when an aqueous solution is prepared so as to have a content of the PVOH-based resin of 4 mass %, the pH of the aqueous solution at 20° C. is usually from 5.5 to 7, preferably from 6 to 7, more preferably from 6.2 to 6.8. If the pH of the aqueous solution is too high, this tends to involve insufficient stability of the melt viscosity or easy coloration, whereas if the pH is too low, the composition is liable to lack the stability of the melt viscosity. The pH of the aqueous solution can be adjusted by controlling, for example, the content ratio of the above carboxylic acid and alkaline (earth) metal salt. Here, the pH of the aqueous solution is measured in an aqueous solution prepared using a PVOH-based resin composition containing the above carboxylic acid and alkaline (earth) metal salt to have a PVOH-based resin content of 4 mass %.

The PVOH-based resin composition of the present invention can have good melt processability even without blending a plasticizer therein, but if desired, a plasticizer may be blended. Examples of the plasticizer include aliphatic polyhydric alcohols (e.g., ethylene glycol, hexanediol, glycerin, trimethylolpropane, diglycerin), compounds obtained by adding ethylene oxide to a polyhydric alcohol such as glycerin, various alkylene oxides (e.g., ethylene oxide, propylene oxide, a mixed adduct of ethylene oxide and propylene oxide), sugars (e.g., sorbitol, mannitol, pentaerythritol, xylol, arabinose, ribulose), phenol derivatives such as bisphenol A and bisphenol S, amide compounds such as N-methylpyrrolidone, glucosides such as α-methyl-D-glucoside, and water. The amount blended thereof is preferably 100 parts by mass or less, more preferably 20 parts by mass or less, still more preferably 10 parts by mass or less, per 100 parts by mass of the PVOH-based resin.

Also, an additive such as a thermoplastic resin (for example, polyethylene, polypropylene or polyester in the presence of a compatibilizer), perfume, foaming agent, deodorant, extender, filler (an inorganic filler such as talc, clay, montmorillonite, calcium carbonate, glass bead, glass fiber, silica, mica, alumina, hydrotalcite, titanium oxide, zirconium oxide, boron nitride and aluminum nitride, and an organic filler such as melamine-formalin-based resin), releasing agent, ultraviolet absorber, antioxidant, processing stabilizer, weather resistance stabilizer, fungicide and antiseptic, may be appropriately blended. Incidentally, a filler is suitably used for the purpose of adjusting the hydrolysis or biodegradation rate of the PVOH-based resin or imparting anti-blocking property or printing applicability to the resin.

The PVOH-based resin composition obtained in this way may be directly subjected to melt processing, but in consideration of workability or discharge stability at the melt processing, the composition is preferably once kneaded in a melted state and then solidified by cooling into a pellet or the like form.

As the means therefor, a known kneading apparatus such as kneader ruder, extruder, mixing roll, Banbury mixer and blast mill may be used, but usually, a single-screw or twin-screw extruder is preferably used in industry. It is also preferred to provide a vent suction device, a gear pump device, a screen device, a strand-supporting belt, a dry fog generator or the like, if desired. In particular, when one or more vent holes are provided in the extruder and used for sucking under reduced pressure to remove moisture or a by-product (for example, a thermally decomposed low-molecular-weight material) or when an inert gas such as nitrogen is continuously fed into the hopper to prevent mingling of oxygen into the extruder, pellets of a PVOH-based resin composition having excellent quality and being reduced in thermal coloring or thermal degradation can be obtained.

The PVOH-based resin composition of the present invention has singular non-colorability and aging stability of the melt viscosity. More specifically, the YI (Yellow Index) value of an extruded product (melt-extruded pellet) obtained using an extruder under a condition of a resin temperature of 210° C. and a residence time of 3 minutes is 50 or less, preferably from 5 to 48, more preferably from 10 to 45. Here, the YI value can be measured using a spectral colorimeter. Also, the PVOH-based resin composition of the present invention has a ratio of a torque at 60 minutes after the start of kneading to a torque after 10 minutes (a torque after 60 minutes/a torque after 10 minutes) when melt-kneaded at a resin temperature of 230° C. with Plastograph of 3 or less, preferably from 0.3 to 3, more preferably from 1 to 2.8.

The PVOH-based resin composition of the present invention can be suitable used for melt processing. The melt-processed article using the PVOH-based resin composition of the present invention is not particularly limited, and examples thereof include a film, a sheet, a bottle, a pipe, a tube, an injection molded product, an extruded product with an atypical cross-section, and a fiber or nonwoven fabric by a melt spinning method. As the melt processing method for obtaining such a melt-processed article, a compression molding method, a transfer molding method, an extrusion molding method, an injection molding method, an inflation molding method, a hollow molding method, a blow molding method, a calender molding method, a foam molding method, a vacuum molding method and the like are mainly employed. The melting temperature is usually selected from a range of 150 to 250° C. in many cases, but the PVOH-based resin composition of the present invention can be melt-processed at a low temperature of 150 to 220° C. (further from 185 to 210° C.) and when the saponification degree of the PVOH-based resin is decreased, molding at a lower temperature is possible.

Specific examples of the melt-processed article obtained using the PVOH-based resin composition of the present invention include a fiber, a gas-barrier film, a readily water-soluble film (particularly, a readily water-soluble film for packaging an article such as agricultural chemical, detergent, laundry clothing, additive for civil engineering, disinfectant, dye and pigment), an agricultural film, a sheet, a pipe, a tube, a leakage preventive film, a temporary film, a water-soluble fiber for chemical lace, and a PVDC-substituting film for food packaging. The sheet or film as a melt-processed article may be uniaxially or biaxially stretched and, if desired, may be further subjected to cooling treatment, rolling treatment, printing treatment, dry-lamination treatment, solution- or melt-coating treatment, bag making, deep drawing, box making, tube making, splitting, cutting or the like.

EXAMPLES

The present invention is described in further detail below by referring to Examples, but the present invention is not limited to these Examples as long as its purport is observed. In the following, unless otherwise indicated, the "%" and "part" are on the mass basis.

Example 1

Production of PVOH-Based Resin

A reaction can equipped with a reflux condenser, a dropping funnel and a stirrer was charged with 321.4 g of vinyl acetate, 241.1 g of methanol and 38.6 g of 3,4-diacetoxy-1-butene and after raising the temperature with stirring in a nitrogen stream, polymerization was performed by adding 37.8 g of a 4% methanol solution of t-butyl peroxyneodecanoate (half-life: 102 minutes) over 610 minutes. After passing of 35 minutes from the start of polymerization, 571.4 g of vinyl acetate and 68.6 g of 3,4-diacetoxy-1-butene were added over 480 minutes, and the polymerization was further performed for 105 minutes. At the time when the polymerization ratio of vinyl acetate reached 89.5%, the polymerization was terminated by adding 38 ppm (based on the charged vinyl acetate) of p-methoxyphenol as a polymerization inhibitor. Subsequently, an unreacted vinyl acetate monomer was removed out of the system by a methanol vapor-blowing method to obtain a methanol solution of copolymerization product.

The solution above was diluted with methanol to adjust the copolymerization product concentration to 66% and charged into a kneader, and while keeping the solution temperature at 40° C., a 2% methanol solution of sodium hydroxide was added in such a ratio as accounting for 12 mmol per mol of the total amount of vinyl acetate and 3,4-diacetoxy-1-butene in the copolymerization product, thereby performing saponification. After a saponified product was precipitated as particles to make a slurry with the progress of saponification, acetic acid was added to account for 0.35 equivalents to the amount of sodium hydroxide added, and methanol was further added to give a resin concentration of 9% in the slurry. The resulting slurry was stirred in the kneader for 15 minutes and then subjected to separation by filtration and drying in a hot-air drier to obtain a PVOH-based resin composition (powder) containing acetic acid and sodium acetate.

The saponification degree of the PVOH-based resin in the obtained PVOH-based resin composition was analyzed by the alkali consumption required for hydrolysis of the remaining vinyl acetate and the remaining 3,4-diacetoxy-1-butene and found to be 99.2 mol %, and the average polymerization degree was analyzed in accordance with JIS K6726 and found to be 450. Also, the amount introduced of a 1,2-diol structure-containing side chain was measured and calculated by $^{1}$H-NMR spectrum (solvent: DMSO-d6, internal standard: tetramethylsilane) and found to be 6 mol %. Furthermore, the absorbance of 280 nm in an ultraviolet absorbance spectrum of the 4% aqueous solution of the PVOH-based composition was 0.18, and the pH at 20° C. of the aqueous solution was 6.2. This pH was measured using a glass electrode pH meter (F-22, manufactured by Horiba Ltd.) and a pH electrode for low electroconductivity (6377-10D, manufactured by Horiba Ltd.). In addition, the YI value and torque ratio of the PVOH-based resin composition were measured by the following measuring methods. These physical property values are shown together in Table 1.

[YI Value Measuring Method]

The YI value of an extruded product (melt-extruded pellet) obtained by using an extruder was measured under the following conditions.

Extruder: A twin-screw extruder KZW-15-60MG manufactured by Technovel Corporation, screw diameter: 15 mm, L/D=60.

Screw: Only a delivery segment (no kneading part).
Resin temperature: 210° C.
Residence time: 3 minutes.
Measuring device: A spectral colorimeter Σ90 manufactured by Nippon Denshoku Industries Co., Ltd.
Measurement conditions: The hopper part was nitrogen-sealed.

[Torque Ratio Measuring Method]

The torque ratio (torque at 60 minutes after start of kneading/torque after 10 minutes) of the PVOH-based resin composition was measured by Plastograph under the following conditions.

Plastograph: Plastograph EC plus with a roller mixer R60B (chamber capacity: 60 mL), manufactured by Brabender.
Amount of resin charged: 55 g.
Preheating time: 3 minutes.
Resin temperature: 230° C.
Kneading condition: 50 rpm.

Examples 2, 3 and 4

By changing the content ratio of acetic acid/sodium acetate in Example 1, PVOH-based resin compositions where the pH of the 4% aqueous solution (20° C.) was 6.8 (Example 2), 6.2 (Example 3) or 5.8 (Example 4) were obtained. Respective physical property values are shown together in Table 1.

Comparative Example 1

A PVOH-based resin composition was obtained in the same manner except for changing the polymerization initiator to acetyl peroxide (half-life: 1,920 minutes) in Example 1. Respective physical property values are shown together in Table 1.

Comparative Examples 2 and 3

By changing the content ratio of acetic acid/sodium acetate in Example 1, PVOH-based resin compositions where the pH of the 4% aqueous solution (20° C.) was 5.3 (Comparative Example 2) or 7.2 (Comparative Example 3) were obtained. Respective physical property values are shown together in Table 1.

TABLE 1

| | Modification Degree (mol %) | Polymerization Degree | Saponification Degree (mol %) | Absorbance | pH | YI Value | Torque Ratio |
|---|---|---|---|---|---|---|---|
| Example 1 | 6 | 450 | 99.2 | 0.18 | 6.5 | 40 | 1.4 |
| Example 2 | 6 | 450 | 99.4 | 0.19 | 6.8 | 45 | 1.2 |
| Example 3 | 6 | 450 | 99.3 | 0.18 | 6.2 | 35 | 1.6 |
| Example 4 | 6 | 450 | 99.8 | 0.18 | 5.8 | 35 | 1.9 |
| Comparative Example 1 | 6 | 450 | 99.2 | 0.42 | 6.6 | 74 | 2.1 |
| Comparative Example 2 | 6 | 450 | 98.5 | 0.18 | 5.3 | 23 | 3.2 |
| Comparative Example 3 | 6 | 450 | 99.5 | 0.18 | 7.2 | 73 | 1.1 |

As seen in Table 1, the PVOH-based resin compositions of Examples 1 to 4 where the absorbance of 280 nm in an ultraviolet absorbance spectrum of the 4 mass % aqueous solution is from 0.1 to 0.3 and the pH at 20° C. of the aqueous solution is from 5.5 to 7, have the YI values as small as 50 or less and the torque ratios as low values of 3 or less. That is, all of the PVOH-based resin compositions of Examples 1 to 4 less suffer from coloration (yellowing) of the molded article and have high aging stability of the melt viscosity and therefore, these are suitable for melt processing.

On the other hand, in the PVOH-based resin composition of Comparative Example 1, the absorbance of 280 nm in the ultraviolet absorbance spectrum of the 4 mass % aqueous solution is higher than 0.3 and the YI value exceeds 50. Also, in the PVOH-based resin composition of Comparative Example 2, the pH at 20° C. of the 4 mass % aqueous solution is less than 5.5 and the torque ratio exceeds 3. Furthermore, in the PVOH-based resin composition of Comparative Example 3, the pH at 20° C. of the 4 mass % aqueous solution is higher than 7 and the YI value exceeds 50. Accordingly, all of the PVOH-based resin compositions of Comparative Examples 1 to 3 have a problem that the molded article is readily colored and the viscosity of the resin in the melted state is increased with aging, and these compositions are not considered to be suitable for melt processing.

While this application has been described in detail and with reference to specific embodiments thereof, it will be apparent to one skilled in the art that various changes and modifications can be made therein without departing from the spirit and scope of the invention.

This application is based on Japanese Patent Application (Patent Application No. 2009-108621) filed on Apr. 28, 2009, the contents of which are incorporated herein by way of reference.

INDUSTRIAL APPLICABILITY

The PVOH-based resin composition of the present invention less suffers from coloration due to melt processing and has high aging stability of the melt viscosity and therefore, the composition can be suitably used for melt processing.

The invention claimed is:

1. A polyvinyl alcohol-based resin composition comprising:
   a water soluble polyvinyl alcohol-based resin which comprises a structural unit represented by formula (1), and has an absorbance of 0.1 to 0.3 of 280 nm in an ultraviolet absorbance spectrum when a 4 mass % aqueous solution thereof is prepared;
   a carboxylic acid; and
   at least one of an alkaline metal salt and an alkaline-earth metal salt,
   wherein, when an aqueous solution of the polyvinyl alcohol-based resin composition is prepared so as to have a content of the polyvinyl alcohol-based resin of 4 mass %, the pH of the aqueous solution at 20° C. is from 5.5 to 7
   wherein formula (I) is:

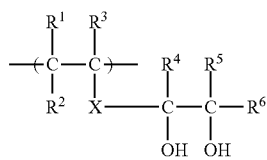
(1)

in which $R^1$, $R^2$, and $R^3$ independently represent a hydrogen atom or an organic group, X represents a single bond or a bonding chain, and $R^4$, $R^5$, and $R^6$ independently represent a hydrogen atom or an organic group.

2. The polyvinyl alcohol-based resin composition according to claim 1,
   wherein the polyvinyl alcohol-based resin comprising the structural unit represented by formula (1) is obtained by saponification of a copolymerization product which is produced by copolymerizing a vinyl ester-based monomer and a compound having a 1,2-diol structure represented by formula (2) or a derivative thereof, using an organic peroxide having a half-life at 60° C. of 10 to 300 minutes as a polymerization initiator
   wherein formula (2) is:

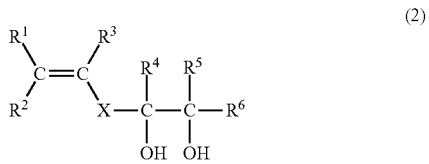
(2)

in which $R^1$, $R^2$, and $R^3$ independently represent a hydrogen atom or an organic group, X represents a single bond or a bonding chain, and $R^4$, $R^5$, and $R^6$ independently represent a hydrogen atom or an organic group.

3. A water soluble polyvinyl alcohol-based resin composition, in which a YI value as an extruded product obtained using an extruder under a condition of a resin temperature of 210° C. and a residence time of 3 minutes is 50 or less, and a ratio of a torque at 60 minutes after the start of kneading to a torque after 10 minutes is 3 or less when melt-kneaded at a resin temperature of 230° C. with a plastograph.

* * * * *